(12) United States Patent
Vukovic et al.

(10) Patent No.: US 12,703,397 B2
(45) Date of Patent: Aug. 11, 2026

(54) SYSTEMS AND METHODS FOR DISTRIBUTING A CHANNEL LOAD

(71) Applicant: Ford Global Technologies, LLC, Dearborn, MI (US)

(72) Inventors: Ivan Vukovic, Birmingham, MI (US); Krishna Bandi, Novi, MI (US); Syed Amaar Ahmad, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 18/639,738

(22) Filed: Apr. 18, 2024

(65) Prior Publication Data

US 2025/0326407 A1 Oct. 23, 2025

(51) Int. Cl.
*B60W 60/00* (2020.01)
*G08G 1/0967* (2006.01)

(52) U.S. Cl.
CPC ... *B60W 60/0025* (2020.02); *G08G 1/096725* (2013.01)

(58) Field of Classification Search
CPC .................... B60W 60/0025; G08G 1/096725
See application file for complete search history.

(56) References Cited

U.S. PATENT DOCUMENTS

| | | | | |
|---|---|---|---|---|
| 10,158,544 | B2 | 12/2018 | Bielinski et al. | |
| 11,650,862 | B2 | 5/2023 | Tanna et al. | |
| 2017/0180228 | A1* | 6/2017 | Bielinski | H04L 43/026 |
| 2022/0038554 | A1 | 2/2022 | Merwaday et al. | |
| 2023/0145508 | A1 | 5/2023 | Kaphengst et al. | |
| 2023/0311910 | A1* | 10/2023 | Naga | H04W 4/44 701/1 |

* cited by examiner

*Primary Examiner* — Angela Y Ortiz
*Assistant Examiner* — Jeffrey R Chalhoub
(74) *Attorney, Agent, or Firm* — Burris Law, PLLC

(57) ABSTRACT

A method including the receipt of a marshaling request, the identification of a channel load threshold, the determination of whether a vehicle of one or more vehicles satisfies a distribution-related criterion, and the assignment of the vehicle to a road-side unit of a plurality of road-side units. The assignment is based on at least a determination that a communication load of the road-side unit is below the channel load threshold.

19 Claims, 6 Drawing Sheets

SYSTEMS AND METHODS FOR DISTRIBUTING A CHANNEL LOAD

FIELD

The present disclosure relates to managing a channel load associated with a road-side unit. More specifically, the present disclosure controls the distribution of one or more messages transmitted to one or more vehicles.

BACKGROUND

The statements in this section merely provide background information related to the present disclosure and may not constitute prior art.

Automated vehicle marshaling generally relies on short-range vehicle-to-infrastructure communication methods. For an infrastructure to remotely control a vehicle, the infrastructure generates commands and transmits the commands to the vehicle, via a road-side unit. When marshaling multiple vehicles, the infrastructure needs to transmit a plurality of commands to all of the vehicles. However, a channel load associated with the road-side unit is limited by standards defined by the Society of Automotive Engineers, which restricts the functionality of the road-side unit by forcing the road-side unit to drop data packets instead of delivering the data packets to the vehicles when data congestion occurs.

The present disclosure addresses these and other issues related to the management of a channel load associated with a road-side unit.

SUMMARY

This section provides a general summary of the disclosure and is not a comprehensive disclosure of its full scope or all of its features.

The present disclosure provides a method comprising: receiving, from a first vehicle of one or more vehicles, a marshaling request; identifying, for a road-side unit of a plurality of road-side units, a channel load threshold; determining, based on the marshaling request, whether the first vehicle satisfies a distribution-related criterion; and assigning the first vehicle to the road-side unit of the plurality of road-side units, wherein the assignment of the first vehicle is based on determining a communication load of the road-side unit is below the channel load threshold and determining the first vehicle satisfies the distribution-related criterion; wherein the assignment of the first vehicle is determined, based at least in part on, using an algorithm configured to maximize a number of assigned vehicles to the road-side unit of the plurality of road-side units; wherein the channel load threshold indicates a capacity for the road-side unit of the plurality of road-side units to support communication with the first vehicle; wherein the distribution-related criterion includes a distance of the first vehicle from the road-side unit of the plurality of road-side units, a message priority, a received signal strength indicator, a signal quality at the road-side unit of the plurality of road-side units, or a combination thereof; further comprising: updating one or more priorities associated with marshaling of a second vehicle of the one or more vehicles; identifying, based on the updated one or more priorities and a marshaling request received from the second vehicle, the channel load threshold for the road-side unit of the plurality of road-side units; determining, based on the updated one or more priorities, whether the second vehicle satisfies the distribution-related criterion; and assigning the second vehicle to an alternative road-side unit of the plurality of road-side units, wherein the assignment is based on determining the communication load of the road-side unit meets or exceeds the channel load threshold and determining the second vehicle satisfies the distribution-related criterion; wherein the assignment of the second vehicle is further based on the channel load threshold of the alternative road-side unit of the plurality of road-side units being below the channel load threshold; and wherein the one or more priorities are determined based at least on a priority associated with the channel load threshold and the distribution-related criterion.

The present disclosure provides a method comprising: calculating, for each message of one or more messages, a message-rating score based on one or more distribution-related criteria; sorting, in a plurality of virtual queues, the one or more messages based on the message-rating score of each message of the one or more messages; determining a number of messages each road-side unit of a plurality of road-side units can transmit to one or more vehicles based on a congestion limit associated with each road-side unit of the plurality of road-side units; and assigning each vehicle of one or more vehicles to a respective road-side unit of the plurality of road-side units, wherein the assignment is based on determining the number of messages each road-side unit of the plurality of road-side units can transmit to the one or more vehicles and an order in which the one or more messages are sorted; wherein the assignment is determined, based at least in part on, using an algorithm configured to maximize a number of assigned vehicles of the one or more vehicles to each road-side unit of the plurality of road-side units; wherein each virtual queue of the plurality of virtual queues is associated with a respective road-side unit of the plurality of road-side units; wherein the one or more distribution-related criteria includes a distance of each vehicle of the one or more vehicles from each road-side unit of the plurality of road-side units, a message priority, a received signal strength indicator, a signal quality at each road-side unit of the plurality of road-side units, or a combination thereof; wherein determining the number of messages each road-side unit of the plurality of road-side units can transmit to the one or more vehicles further comprises: identifying, in each virtual queue of the plurality of virtual queues, which of the virtual queues do not have at least one instance of a message of the one or more messages below the congestion limit; identifying, in any virtual queue of the plurality of virtual queues, any duplicate messages of the one or more messages; removing the identified duplicate messages with a lowest message-rating score; and transmitting the removed duplicate messages to one or more virtual queues of the plurality of virtual queues that do not have at least one instance of the message of the one or more messages below the congestion limit; and further comprising: identifying, in any virtual queue of the plurality of virtual queues, the identified duplicate messages with a highest message-rating score; and retaining the identified duplicate messages with the highest message-rating score in the virtual queue that has the identified duplicate messages based on each virtual queue of the plurality of virtual queues having at least one instance of the message of the one or more messages below the congestion limit.

The present disclosure provides a system comprising: a central server configured to: receive, from a first vehicle of one or more vehicles, a marshaling request, identify, for a road-side unit of a plurality of road-side units, a channel load threshold, determine, based on the marshaling request, whether the first vehicle satisfies a distribution-related criterion, and assign the first vehicle to the road-side unit of the plurality of road-side units, wherein the assignment of the first vehicle is based on determining a communication load of the road-side unit is below the channel load threshold and determining the first vehicle satisfies the distribution-related criterion; and the first vehicle configured to: transmit the marshaling request to the central server; wherein the assignment of the first vehicle is determined, based at least in part, using an algorithm configured to maximize a number of assigned vehicles to the road-side unit of the plurality of road-side units; wherein the channel load threshold indicates a capacity for the road-side unit of the plurality of road-side units to support communication with the first vehicle; wherein the distribution-related criterion includes a distance of the first vehicle from the road-side unit of the plurality of road-side units, a message priority, a received signal strength indicator, a signal quality at the road-side unit of the plurality of road-side units, or a combination thereof; wherein the central server is further configured to: update one or more priorities associated with marshaling of a second vehicle of the one or more vehicles; identify, based on the updated one or more priorities and a marshaling request received from the second vehicle, the channel load threshold for the road-side unit of the plurality of road-side units; determine, based on the updated one or more priorities, whether the second vehicle satisfies the distribution-related criterion; and assign the second vehicle to an alternative road-side unit of the plurality of road-side units, wherein the assignment is based on determining the communication load of the road-side unit meets or exceeds the channel load threshold and determining the second vehicle satisfies the distribution-related criterion; wherein the assignment of the second vehicle is further based on the channel load threshold of the alternative road-side unit of the plurality of road-side units being below the channel load threshold; and wherein the one or more priorities are determined based at least on a priority associated with the channel load threshold and the distribution-related criterion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
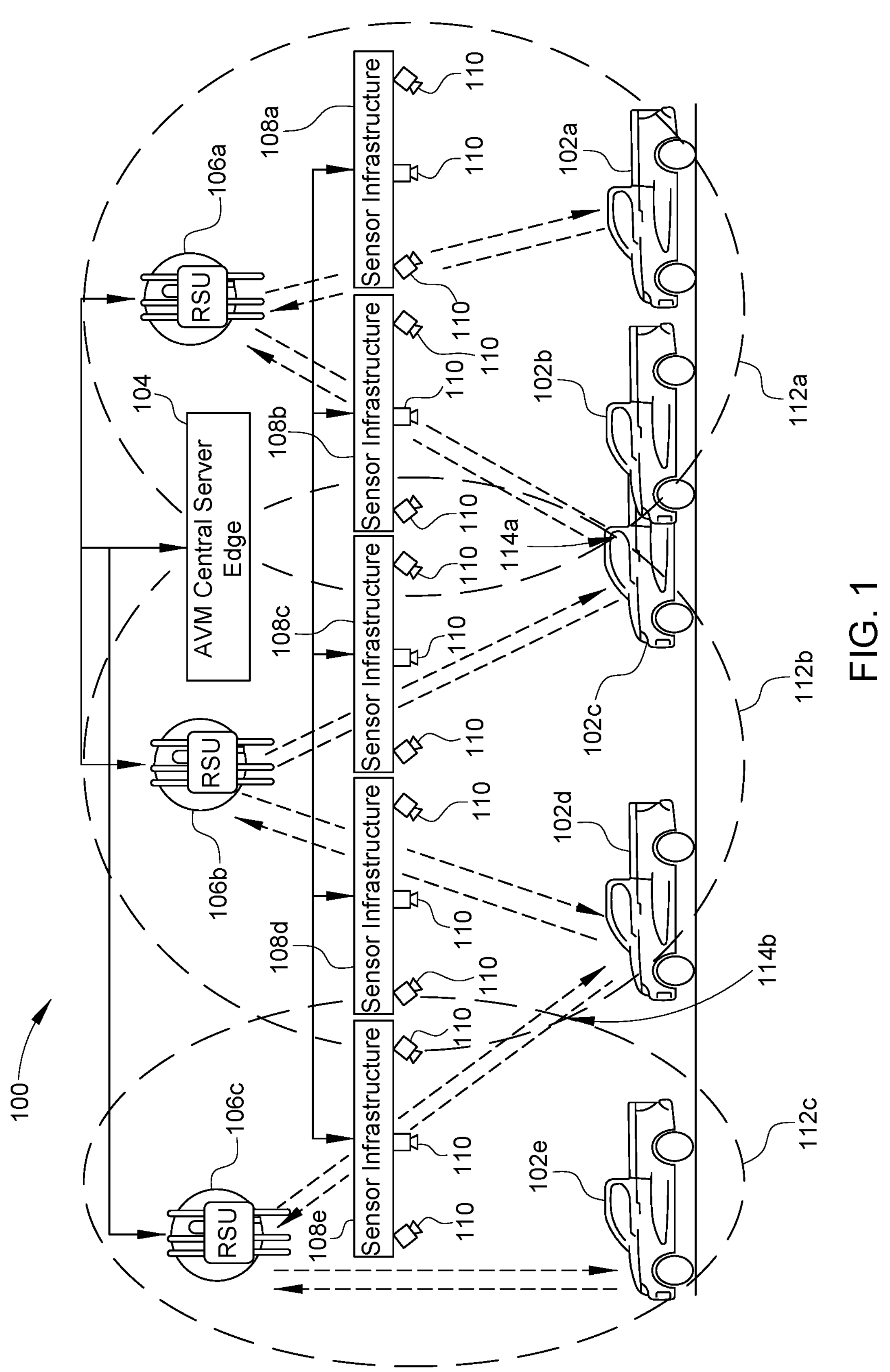
FIG. 1 illustrates a system for autonomous vehicle marshaling in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for the reduction of congestion of a channel load associated with a road-side unit (RSU) in relation to the distribution of one or more messages transmitted to one or more autonomous vehicles. For example, the channel load can represent a fraction of time and/or a bandwidth an RSU-to-vehicle link has been allocated (e.g., a 5% channel-limit that is allowed to be occupied by a particular link transmission). One or more examples relies upon a plurality of RSUs and/or an algorithm to distribute the channel load such that no single RSU is tasked with sending messages over a congestion limit associated with the RSU. For example, the distribution of the channel load is provided as an optimization of channel quality to enhance communication between an infrastructure system and an autonomous vehicle. As another example, such an optimization routine solves any issues created by congestion of a single RSU when a plurality of autonomous vehicles are being marshaled. As an additional example, such an optimization routine optimizes the delivery of one or more messages to the autonomous vehicles from a central server associated with the infrastructure system.

FIG. 1 illustrates a marshaling system 100 that facilitates an engagement of one or more autonomous vehicles 102*a*-102*e* with an infrastructure system (not shown). Generally, an automated vehicle marshaling (AVM) central server edge 104 (e.g., an edge processor) is connected to one or more RSUs 106*a*-106*c*. For example, the AVM central server edge 104 is connected to the one or more RSUs 106*a*-106*c* by a wireless means, a wired means, or a combination thereof. The AVM central server edge 104 is also connected to one or more sensor infrastructures 108*a*-108*e*. For example, the AVM central server edge 104 is connected to the one or more sensor infrastructures 108*a*-108*e* by a wireless means, a wired means, or a combination thereof.

The AVM central server edge 104 is configured to utilize sensor data received from the one or more sensor infrastructures 108*a*-108*e* to determine a location of any of the one or more autonomous vehicles 102*a*-102*e*. Each of the one or more sensor infrastructures 108*a*-108*e* include a set of infrastructure sensors 110 such as, for example, a two-dimensional (2D) camera, a three-dimensional (3D) camera, an infrared sensor, a radar scanner, a laser scanner, a light detection and ranging (LIDAR) sensor, an ultrasonic sensor, among others. The set of infrastructure sensors 110 monitor the movement of each of the one or more autonomous vehicles 102*a*-102*e* as the one or more autonomous vehicles 102*a*-102*e* move through an environment (e.g., a manufacturing environment or a parking lot).

In one or more examples, the sensor data is generated based on the type of monitoring being performed by the set of infrastructure sensors 110 (e.g., the movement of each of the one or more autonomous vehicles 102*a*-102*e* or the environment itself). In one form, the one or more sensor infrastructures 108_a_-108_e_ provide pose, routing, and obstacle data of an environment to the AVM central server edge 104.

The AVM central server edge 104 is further configured to utilize the one or more RSUs 106_a_-106_c_ to facilitate communication between the AVM central server edge 104 and any of the one or more autonomous vehicles 102_a_-102_e_. The one or more RSUs 106_a_-106_c_ are equipped with a cellular vehicle-to-infrastructure communication system (referred to as "CV2X systems"). As an example, the one or more RSUs 106_a_-106_c_ are equipped with a PC5-based CV2X that employs radio frequency sidelink communication for low latency vehicle sensor connectivity.

Each of the one or more RSUs 106_a_-106_c_ are configured to receive one or more infrastructure-side data packets from the AVM central server edge 104. Generally, each of the one or more RSUs 106_a_-106_c_ can include various components for performing the operations described herein, such as, but not limited to, transceivers, processor circuits, memory circuits, routers, and/or input/output interface hardware. For example, the one or more infrastructure-side data packets can include one or more instructions, one or more signals, or a combination thereof. Each of the one or more RSUs 106_a_-106_c_ are further configured to broadcast the one or more infrastructure-side data packets to any of the one or more autonomous vehicles 102_a_-102_e_ within range of the one or more RSUs 106_a_-106_c_. As another example, the one or more infrastructure-side data packets are generated from one or more marshaling infrastructure messages (MIMs). As another example, each of the one or more RSUs 106_a_-106_c_ are configured to broadcast the one or more infrastructure-side data packets via one or more wireless communication protocols, such as a CV2X protocol, a private and/or public cellular protocol, a Wi-Fi protocol, a long range (LoRA) signal protocol, a Bluetooth protocol, and/or a UWB protocol.

Each of the one or more RSUs 106_a_-106_c_ are further configured to receive one or more vehicle-side data packets including one or more marshaling vehicle messages (MVMs) from any of the one or more autonomous vehicles 102_a_-102_e_. Each of the one or more RSUs 106_a_-106_c_ are additionally configured to forward the one or more vehicle-side data packets to the AVM central server edge 104.

Further illustrated in FIG. 1 is a plurality of RSU network areas 112_a_-112_c_. It is understood that there may be any number of RSU network areas. Each of the plurality of RSU network areas 112_a_-112_c_ provide network coverage, wherein overlapping areas correspond to at least a midpoint between each of the one or more RSUs 106_a_-106_c_. For example, the RSU network area 112_a_ provides network coverage, wherein overlapping areas correspond to at least a midpoint between the RSU 106_a_ and the RSU 106_b_. As another example, the RSU network area 112_b_ provides network coverage, wherein overlapping areas correspond to at least the midpoint between the RSU 106_a_ and the RSU 106_b_, as well as least a midpoint between the RSU 106_b_ and the RSU 106_c_. As yet another example, the RSU network area 112_c_ provides network coverage, wherein overlapping areas correspond to at least a midpoint between the RSU 106_b_ and the RSU 106_c_.

However, each of the plurality of RSU network areas 112_a_-112_c_ aid in supporting network coverage to each of the one or more autonomous vehicles 102_a_-102_e_. For example, in the instance wherein an overlapping hand-off area 114_a_ is covered as an autonomous vehicle of the one or more autonomous vehicles 102_a_-102_e_ travels away from the RSU 106_a_ and toward the RSU 106_b_, both RSUs 106_a_, 106_b_ send the one or more infrastructure-side data packets to the autonomous vehicle of the one or more autonomous vehicles 102_a_-102_e_ for optimal coverage. As another example, in the instance wherein an overlapping hand-off area 114_b_ is covered as an autonomous vehicle of the one or more autonomous vehicles 102_a_-102_e_ travels away from the RSU 106_b_ and toward the RSU 106_c_, both RSUs 106_b_, 106_c_ send the one or more infrastructure-side data packets to the autonomous vehicle of the one or more autonomous vehicles 102_a_-102_e_ for optimal coverage. As a further example, either of the RSU pairs 106_a_, 106_b_ and/or 106_b_, 106_c_ complement the respective network coverage each of the one or more RSUs 106_a_-106_c_ provide to any of the one or more autonomous vehicles 102_a_-102_e_. As yet another example, each of the one or more autonomous vehicles 102_a_-102_e_ are configured to send the one or more vehicle-side data packets back to the one or more RSUs 106_a_-106_c_.

The AVM central server edge 104 is additionally configured to determine a precise location of any of the one or more autonomous vehicles 102_a_-102_e_. For example, the AVM central server edge 104 can determine a precise location of any of the one or more autonomous vehicles 102_a_-102_e_ at least based on the sensor data and/or the one or more vehicle-side data packets. It is understood that each of the one or more vehicle-side data packets can include a received signal strength indicator (RSSI) associated with the originating autonomous vehicle of the one or more autonomous vehicles 102_a_-102_e_. The AVM central server edge 104 is further configured to determine a closest (e.g., in distance) RSU of the one or more RSUs 106_a_-106_c_ to any of the one or more autonomous vehicles 102_a_-102_e_. For example, the AVM central server edge 104 can determine a closest (e.g., in distance) RSU of the one or more RSUs 106_a_-106_c_ to any of the one or more autonomous vehicles 102_a_-102_e_ at least based on the sensor data and/or the one or more vehicle-side data packets.

The AVM central server edge 104 is also configured to generate a combined RSU selection metric to assign the one or more infrastructure-side data packets to a specific RSU of the one or more RSUs 106_a_-106_c_. For example, the AVM central server edge 104 can generate the combined RSU selection metric based on the distance to a specific autonomous vehicle of the one or more autonomous vehicles 102_a_-102_e_ and/or the RSSI.

The AVM central server edge 104 is configured to run an optimization routine to facilitate the distribution and assignment of the one or more infrastructure-side data packets across each of the one or more RSUs 106_a_-106_c_ as each of the one or more autonomous vehicles 102_a_-102_e_ are marshaled across the environment. For example, the AVM central server edge 104 is configured to maximize the distribution of the one or more infrastructure-side data packets across each of the one or more RSUs 106_a_-106_c_. However, a satisfaction of one or more constraints can be a prerequisite for any of the one or more autonomous vehicles 102_a_-102_e_ being assigned to an RSU of the one or more RSUs 106_a_-106_c_. For example, in an instance wherein the one or more constraints are not satisfied, any of the one or more autonomous vehicles 102_a_-102_e_ may not be assigned to an RSU of the one or more RSUs 106_a_-106_c_ and will continue to await marshaling instructions from the AVM central server edge 104.

The one or more constraints can include, for example, a channel load capacity and/or a distance threshold. More specifically, the channel load capacity of each of the RSUs of the one or more RSUs 106_a_-106_c_, in some examples, is to be less than a maximum value defined by the Society of Automobile Engineers (SAE). Additionally, the distance threshold is to be less than a predefined distance between any of the RSUs of the one or more RSUs 106a-106c and any of the one or more autonomous vehicles 102a-102e. As an example, the distance threshold is a range of a distance any of the one or more autonomous vehicles 102a-102e can be from an RSU of the one or more RSUs 106a-106c to receive the one or more infrastructure-side data packets.

As another example, any of the one or more autonomous vehicles 102a-102e can request marshaling instructions from the AVM central server edge 104 via any of the one or more RSUs 106a-106c. In this example, the AVM central server edge 104 can assign a priority to the autonomous vehicle of the autonomous vehicles 102a-102e that has requested marshaling instructions. As another example, the AVM central server edge 104 can assign a priority to the autonomous vehicle of the autonomous vehicles 102a-102e that has requested marshaling instructions based on whether the requesting autonomous vehicle has already been assigned to an RSU of the one or more RSUs 106a-106c. In an instance wherein the requesting autonomous vehicle has not already been assigned to an RSU of the one or more RSUs 106a-106c, the requesting autonomous vehicle is assigned the lowest priority relative to any other autonomous vehicles of the one or more autonomous vehicles requesting marshaling instructions. However, in an instance wherein the requesting vehicle has already been assigned to an RSU of the one or more RSUs 106a-106c, the requesting autonomous vehicle is assigned a priority based on the distance threshold.

In an instance wherein at least the channel load constraint and/or the distance threshold constraint is satisfied, the AVM central server edge 104 is configured to determine whether the requesting vehicle satisfies a distribution-related criterion. For example, the distribution-related criterion includes a particular distance from each of the one or more autonomous vehicles 102a-102e to each of the one or more RSUs 106a-106c, a specific message priority associated with each of the one or more MIMs generated for transmission to the one or more autonomous vehicles 102a-102e, a received signal strength indicator associated with each of the one or more autonomous vehicles 102a-102e that is within predefined parameters that have been identified as acceptable, a signal quality associated with the RSU of the plurality of RSUs 106a-106c that is within a predefined range, or a combination thereof. In another instance wherein at least the channel load constraint and/or the distance threshold constraint is satisfied and/or the requesting vehicle satisfies the distributed-related criterion, the AVM central server edge 104 is further configured to assign the requesting autonomous vehicle to a particular RSU of the one or more RSUs 106a-106c. The AVM central server edge 104 is also configured to rerun the optimization routine to reevaluate each of the constraints associated with each of the one or more autonomous vehicles 106a-106c and each of the one or more RSUs 106a-106c. For example, the AVM central server edge 104 can rerun the optimization routine with updated priorities to adjust any assignments provided to any of the one or more autonomous vehicles 102a-102e. As another example, the AVM central server edge 104 can rerun the optimization routine at any predetermined interval. However, it is understood that the predetermined interval may be adjusted at any time.

Figure 2:
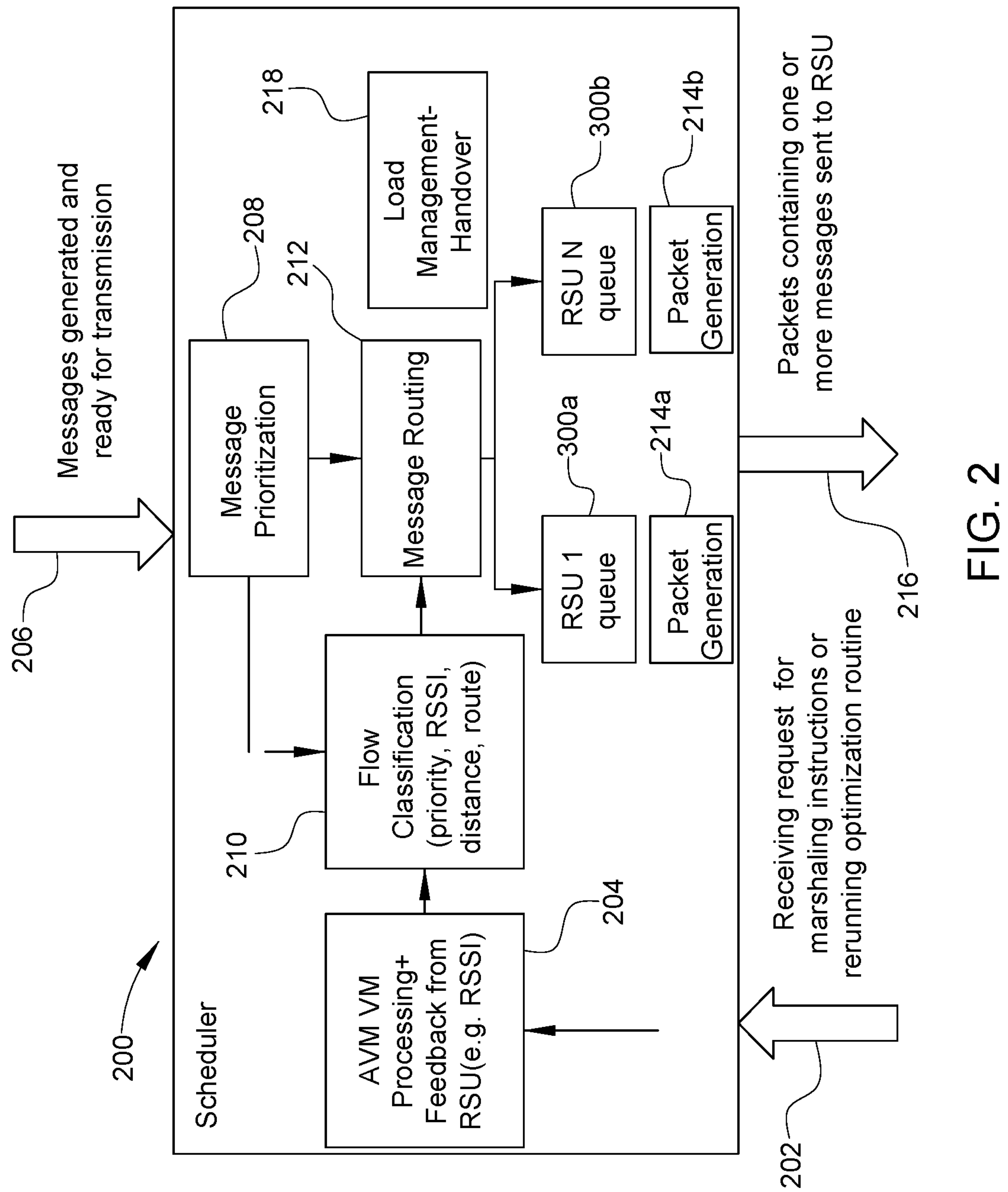
FIG. 2 illustrates a process flow associated with an algorithm for vehicle marshaling in accordance with various implementations.

The AVM central server edge 104 is configured to run another optimization routine to facilitate the distribution and assignment of the one or more infrastructure-side data packets across each of the one or more RSUs 106a-106c as each of the one or more autonomous vehicles 102a-102e are marshaled across the environment, via the utilization of an algorithm. For example, a scheduler 200 associated with the algorithm is depicted in FIG. 2. In general, the scheduler 200 illustrates a flow of one or more MIMs as the AVM central server edge 104 processes the another optimization routine. As another example, the AVM central server edge 104 receives a request (e.g., at step 202) from any of the one or more autonomous vehicles 102a-102e to receive marshaling instructions from the AVM central server edge 104 via any of the one or more RSUs 106a-106c. As a further example, the AVM central server edge 104 can rerun the optimization routine (e.g., at step 202) with updated priorities to adjust any assignments provided to any of the one or more autonomous vehicles 102a-102e. In either scenario (e.g., receiving the request and/or rerunning the optimization routine), the AVM central server edge 104 is configured to process any feedback (e.g., at step 204) from the RSU of the one or more RSUs 106a-106c that is forwarding the one or more vehicle-side data packets to the AVM central server edge 104. As an example, the feedback can be associated with, but is not limited to, the RSSI associated with the originating autonomous vehicle of the one or more autonomous vehicles 102a-102e.

The AVM central server edge 104 is further configured to generate the one or more MIMs (e.g., at step 206). For example, the AVM central server edge 104 can generate the one or more MIMs concurrent to the receipt of the request or the rerunning of the optimization routine. As another example, the AVM central server edge 104 can generate the one or more MIMs at any time. As a further example, the AVM central server edge 104 can generate the one or more MIMs based on the request and/or based on a history of requests. As an additional example, in the instance wherein the AVM central server edge 104 reruns the optimization routine, one of the updated priorities used to adjust an assignment provided to any of the one or more autonomous vehicles 102a-102e can be the history of requests.

The AVM central server edge 104 is additionally configured to prioritize the generated one or more MIMs (e.g., at step 208). For example, the AVM central server edge 104 can prioritize the generated one or more MIMs based at least on the channel load capacity, the distance threshold, and/or a virtual queue (e.g., virtual queues 300a, 300b). As an example, the virtual queue is a virtual setting wherein one or more MIMs can be digitally sorted within a computer system (e.g., a computer system associated with any of the one or more RSUs 106a-106c). For example, the AVM central server edge 104 determines one or more distribution-related metrics associated with the one or more MIMs before each of the one or more MIMs are transmitted to the one or more RSUs 106a-106c. As a further example, the AVM central server edge 104 determines a metric associated with the one or more MIMs before each of the one or more MIMs are transmitted to the one or more RSUs 106a-106c so that the generated one or more MIMs may be prioritized. As another example, the determination of the metric is based on a particular distance from each of the one or more autonomous vehicles 102a-102e to each of the one or more RSUs 106a-106c, a specific message priority associated with each of the one or more MIMs generated for transmission to the one or more autonomous vehicles 102a-102e, a radio frequency (RF) signal quality that is within a predefined range between each of the one or more autonomous vehicles 102a-102e and each of the one or more RSUs 106a-106c, a received signal strength indicator associated with each of the one or more autonomous vehicles 102*a*-102*e* that is within predefined parameters that have been identified as acceptable, or a combination thereof. As an additional example, the determination of the metric is based on the following equation:

$$F_{ij} = F_{metric}(D_{ij}, P_i, Q_{ij}) = \text{metric of vehicle } i \text{ at } RSU\ j$$

wherein $D_{ij}$ is the distance from each of the one or more autonomous vehicles 102*a*-102*e* to each of the one or more RSUs 106*a*-106*c*, $P_i$ is the message priority associated with each of the one or more MIMs generated for transmission to the one or more autonomous vehicles 102*a*-102*e*, and $Q_{ij}$ is the radio frequency signal quality between each of the one or more autonomous vehicles 102*a*-102*e* and each of the one or more RSUs 106*a*-106*c*.

Figure 3:
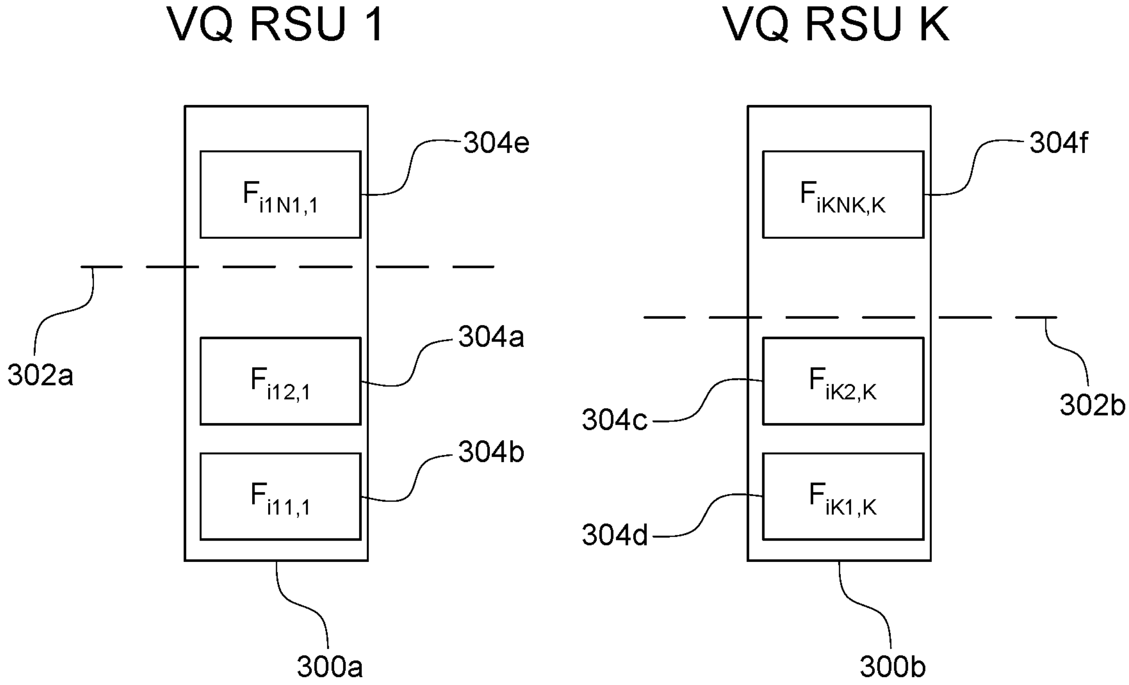
FIG. 3 illustrates a duality of virtual queues associated with the algorithm depicted in FIG. 2 in accordance with various implementations.

FIG. 3 depicts each of the virtual queues 300*a*, 300*b*. Each of the virtual queues 300*a*, 300*b* illustrate sorting of the one or more MIMs in reference to a congestion limit 302*a*, 302*b*. For example, each of the virtual queues 300*a*, 300*b* is configured to sort the one or more MIMs. As another example, the AVM central server edge 104 is configured to determine how many of the one or more MIMs do not violate the congestion limit 302*a*, 302*b*. As an additional example, the one or more MIMs 304*a*-304*c* do not violate the congestion limit because each of the one or more MIMs 304*a*-304*d* fall below the congestion limit 302*a*, 302*b*. As yet another example, the one or more MIMs 304*e*, 304*f* violate the congestion limit because each of the one or more MIMs 304*e*, 304*f* exceed the congestion limit.

For example, each of the one or more RSUs 106*a*-106*c* can have a dedicated virtual queue. The virtual queue 300*a* may be respectively associated with a first RSU of the one or more RSUs 106*a*-106*c* while the virtual queue 300*b* may be respectively associated with a second RSU of the one or more RSUs 106*a*-106*c*. As another example, each of the virtual queues 300*a*, 300*b* can be associated with all of the one or more RSUs 106*a*-106*c*. The AVM central server edge 104 is further configured to identify any of the one or more RSUs 106*a*-106*c* that do not have a MIM in at least one instance below the congestion limit associated with the virtual queue associated with each of the one or more RSUs 106*a*-106*c*.

The AVM central server edge 104 is additionally configured to identify any duplicate MIMs in the virtual queue respective to each of the one or more RSUs 106*a*-106*c*. The AVM central server edge 104 is also configured to remove any of the duplicate MIMs in the virtual queue respective to each of the one or more RSUs 106*a*-106*c* to accommodate any MIMs that were not able to be included in the virtual queue due to capacity issues, for example. The AVM central server edge 104 is configured to determine that the virtual queue respective to each of the one or more RSUs 106*a*-106*c* has at least one copy of each of the MIMs below the congestion limit 302*a*, 302*b* so that the AVM central server edge 104 can remove any remaining duplicate MIMs. For example, the duplicate MIMs and/or the remaining duplicate MIMs are removed so that the MIM with the highest calculated metric, relative to the associated duplicate MIMs, is the particular version of the MIMs that remains in the virtual queue. The AVM central server edge 104 is also configured to decide to maintain multiple copies of a MIM based on whether the MIM has a high priority and/or a high metric relative to calculated metrics associated with other MIMs in the virtual queue.

Referring back to FIG. 2, the AVM central server edge 104 is configured to classify the flow of the one or more MIMs (e.g., at step 210). For example, the AVM central server edge 104 can classify the flow of the one or more MIMs based on the prioritization of the one or more MIMs. As another example, the AVM central server edge 104 can classify the flow of the one or more MIMs based on the assigned priority to the requesting autonomous vehicle of the autonomous vehicles 102*a*-102*e*, the RSSI associated the originating autonomous vehicle of the one or more autonomous vehicles 102*a*-102*e*, the distance from each of the one or more autonomous vehicles 102*a*-102*e* to each of the one or more RSUs 106*a*-106*c*, a traveling route associated with the one or more autonomous vehicles 102*a*-102, or a combination thereof.

The AVM central server edge 104 is also configured to route the one or more MIMs to either of the virtual queues 300*a*, 300*b* (e.g., at step 212). For example, the AVM central server edge 104 can route the one or more MIMs based at least on the prioritization of the one or more MIMs. The AVM central server edge 104 is additionally configured to generate the one or more data packets based on the one or more MIMs routed to the virtual queue 300*a* (e.g., at step 214*a*). The AVM central server edge 104 is further configured to generate the one or more data packets based on the one or more MIMs routed to the virtual queue 300*b* (e.g., at step 214*b*). The AVM central server edge 104 is also configured to transmit the one or more generated data packets to the one or more RSUs 106*a*-106*c* (e.g., at step 216). The AVM central server edge 104 is configured to store any of the one or more MIMs that would otherwise overload either of the virtual queues 300*a*, 300*b* in a database (e.g., at step 218), for example.

Figure 4:
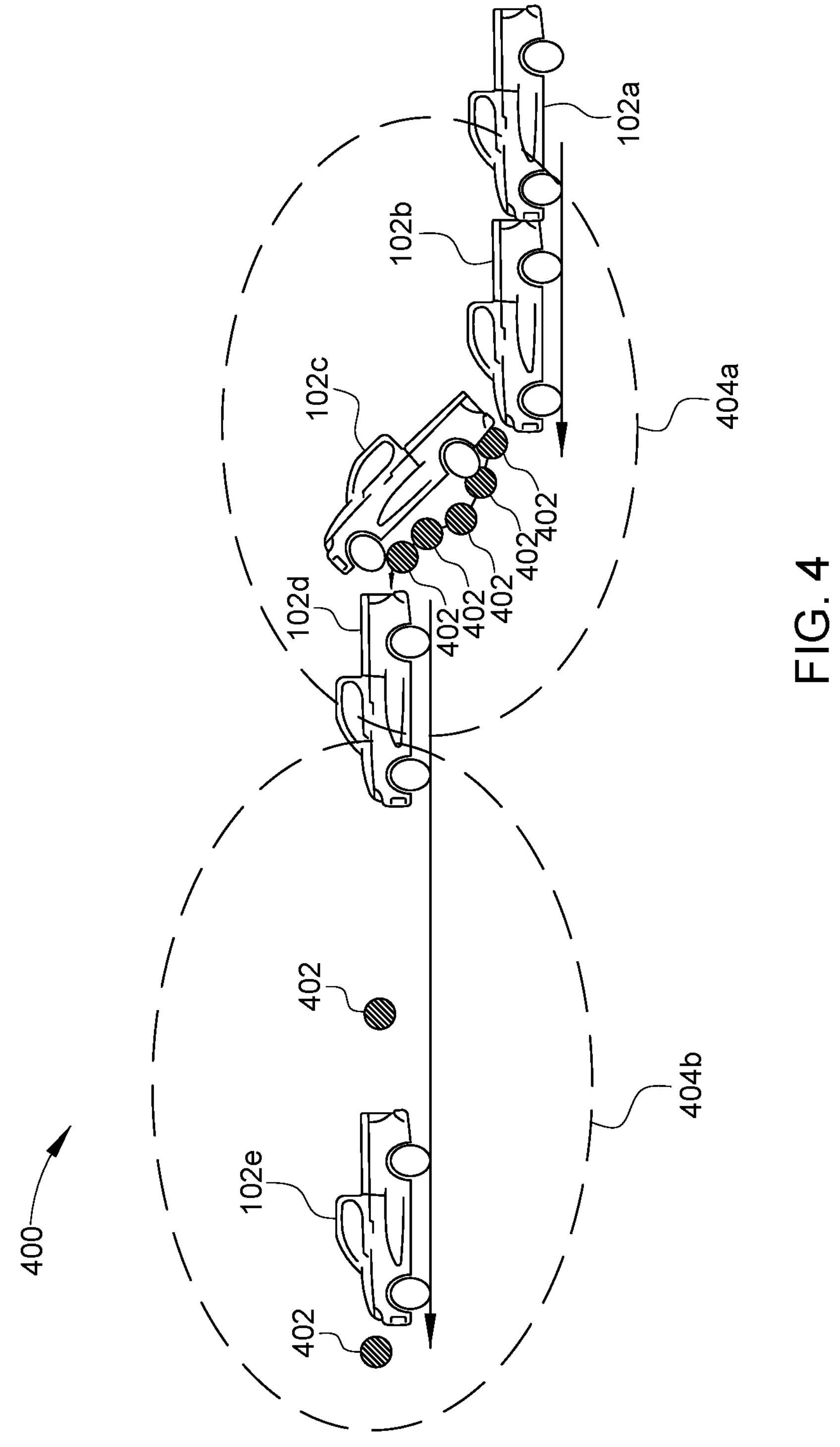
FIG. 4 illustrates an example scenario associated with vehicle marshaling in accordance with various implementations.

FIG. 4 depicts an example scenario 400, demonstrating a number of control points 402 that may be used based on a traveling route of the one or more autonomous vehicles 102*a*-102*e*. For example, a network coverage provided by the one or more RSUs 106*a*-106*c* may be limited by the number of control points 402 required by the one or more autonomous vehicles 102*a*-102*e*. As another example, the number of control points required within a first RSU network area 404*a* (e.g., five control points) can cause the RSU's payload associated with the first RSU network 404*a* to reach a maximum level, thereby limiting the RSU from providing additional control points to other autonomous vehicles and/or to further guide the autonomous vehicle 102*c*. By contrast, the RSU's payload associated with a second RSU network area 404*b* can accommodate the provision of additional control points to other autonomous vehicles and/or to further guide the autonomous vehicles 102*d* and 102*e*. For example, the RSU's payload associated with a second RSU network area 404*b* can accommodate the provision of additional control points to other autonomous vehicles and/or to further guide the autonomous vehicles 102*d* and 102*e* at least based on the number of control points 402 required within the second the second RSU network area 404*b* (e.g., two control points).

Figure 5:
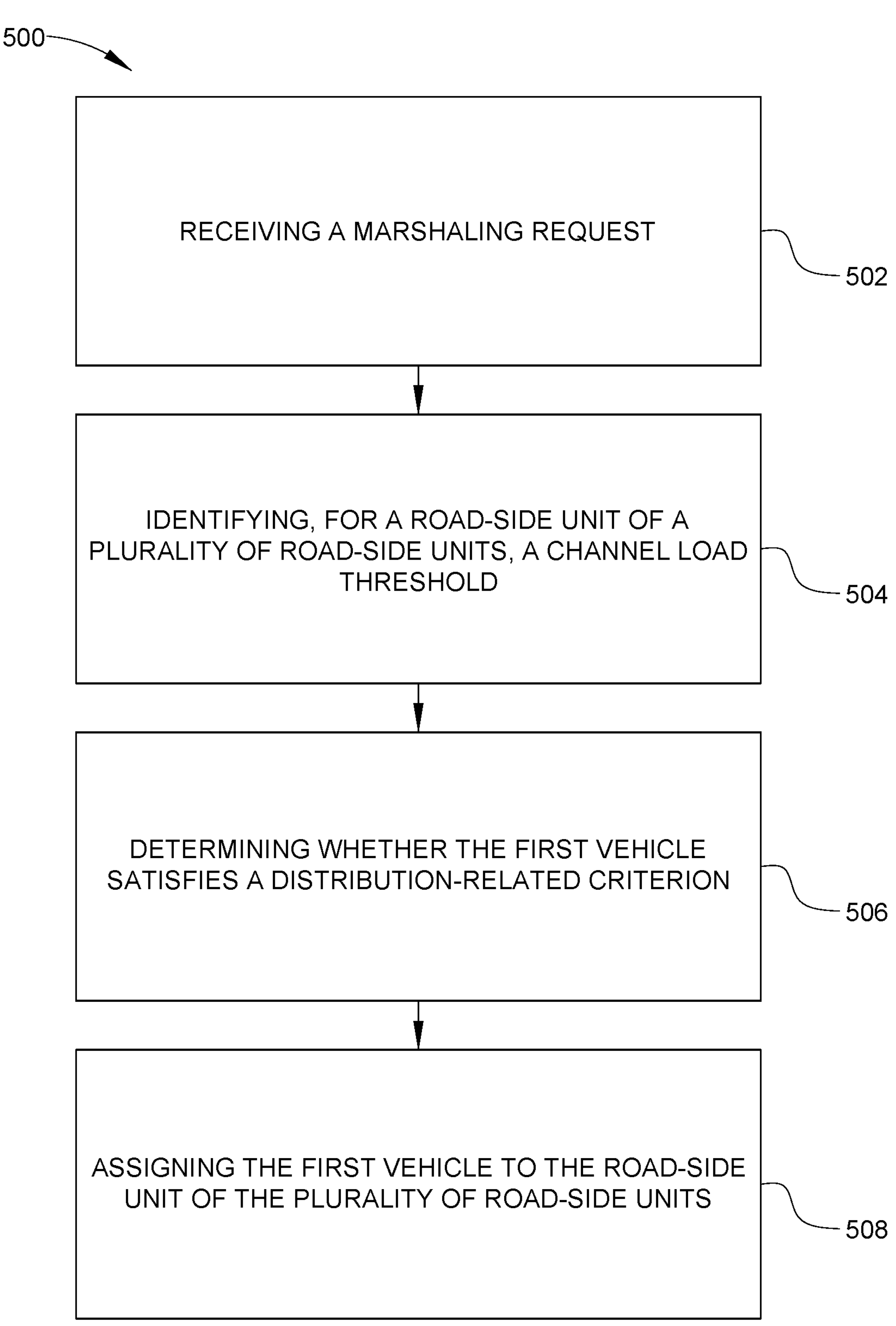
FIG. 5 is a flowchart illustrating an example method for managing a distribution of one or more messages to an autonomous vehicle in accordance with various implementations.

FIG. 5 is a flowchart illustrating an example method 500 for distributing a channel load across a plurality of RSUs (e.g., the one or more RSUs 106*a*-106*c*). For example, the distribution of the channel load is facilitated by an infrastructure system (not shown). At operation 502, a marshaling request is received. For example, the marshaling request is received from a first vehicle of one or more vehicles (e.g., the one or more autonomous vehicles 102a-102e).

At operation 504, a channel load threshold is identified. For example, the channel load threshold is identified for an RSU of the plurality of RSUs. As another example, the channel load threshold indicates a capacity for the RSU of the plurality of RSUs to support communication with the first vehicle. At operation 506, a determination is made regarding whether the first vehicle satisfies a distribution-related criterion. For example, the determination of whether the first vehicle satisfies the distribution-related criterion is based on the marshaling request. As another example, the distribution-related criterion includes a distance of the first vehicle from the RSU of the plurality of RSUs, a message priority, a received signal strength indicator, a signal quality at the RSU of the plurality of RSUs, or a combination thereof.

At operation 508, the first vehicle is assigned to the RSU of the plurality of RSUs. For example, the assignment of the first vehicle is based on determining a communication load of the RSU is below the channel load threshold. As another example, the assignment of the first vehicle is based on determining the first vehicle satisfies the distribution-related criterion. It is understood that the assignment of the first vehicle may be based on the determination that the communication load of the RSU is below the channel load threshold and/or the determination that the first vehicle satisfies the distribution-related criterion. As a further example, the assignment of the first vehicle is determined, based at least in part on, using an algorithm configured to maximize a number of assigned vehicles to the RSU of the plurality of RSUs. As another example, the maximization of the number of assigned vehicles to the RSU of the plurality of RSUs can be a multi-objective maximization. In an instance wherein the priorities are the same for each of the one or more vehicles, then the infrastructure system can cause a maximum number of vehicles to be assigned to a particular RSU of the plurality of RSUs (e.g., an equal channel load is provided to each vehicle relative to each of the vehicle's connection to the particular RSU), for example. In an instance wherein the priorities are different (e.g., based on a traffic topology) for each of the one or more vehicles, then precedence is provided to the vehicle with a higher priority thereby allotting a higher channel load to that vehicle, as another example. For example, if a vehicle can potentially block a flow of traffic at a choke point, in an instance wherein the RSU-to-vehicle link breaks down, then a higher priority will be provided to the vehicle based on the algorithm.

In an example embodiment, one or more priorities associated with marshaling of a second vehicle of the one or more vehicles is updated. For example, the one or more priorities are determined based at least on a priority associated with the channel load threshold. As another example, the one or more priorities are determined based at least on the distribution-related criterion. It is understood that the one or more priorities are determined based at least on the priority associated with the channel load threshold and/or the distribution-related criterion.

In another example embodiment, the channel load threshold for the RSU of the plurality of RSUs is identified. For example, the channel load threshold for the RSU of the plurality of RSUs is identified based on the updated one or more priorities. As another example, the channel load threshold for the RSU of the plurality of RSUs is identified based on a marshaling request received from the second vehicle. It is understood that the channel load threshold for the RSU of the plurality of RSUs is identified based on the updated one or more priorities and/or the marshaling request received from the second vehicle. In a further example embodiment, a determination is made regarding whether the second vehicle satisfies the distribution-related criterion. For example, the determination of whether the second vehicle satisfies the distribution-related criterion is based on the updated one or more priorities.

In yet another example embodiment, the second vehicle is assigned to an alternative RSU of the plurality of RSUs. For example, the assignment of the second vehicle to the alternative RSU of the plurality of RSUs is based on determining that the communication load of the road-side unit meets or exceeds the channel load threshold. As another example, the assignment of the second vehicle to the alternative RSU of the plurality of RSUs is based on determining the second vehicle satisfies the distribution-related criterion. It is understood that the assignment of the second vehicle to the alternative RSU of the plurality of RSUs is based on determining the communication load of the road-side unit meets or exceeds the channel load threshold and/or determining the second vehicle satisfies the distribution-related criterion. As an additional example, the assignment of the second vehicle is further based on the channel load threshold of the alternative RSU of the plurality of RSUs being below the channel load threshold.

Figure 6:
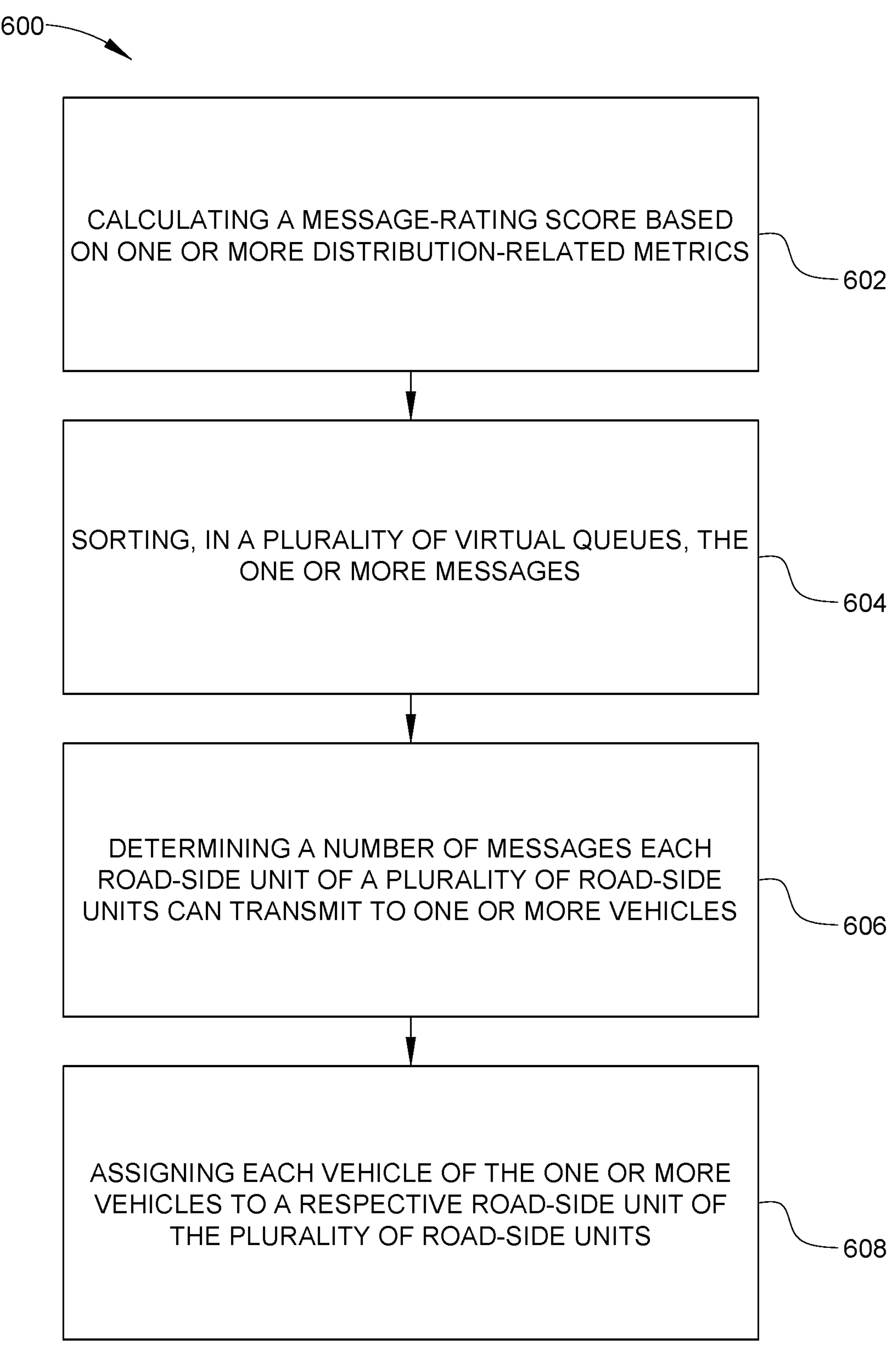
FIG. 6 is a flowchart illustrating another example method for managing a distribution of one or more messages to an autonomous vehicle in accordance with various implementations.

FIG. 6 is a flowchart illustrating an example method 600 for distributing a channel load across a plurality of RSUs (e.g., the one or more RSUs 106a-106c). For example, the distribution of the channel load is facilitated by an infrastructure system (not shown). At operation 602, a message-rating score is calculated. For example, the message-rating score is calculated based on one or more distribution-related metrics. As another example, the message-rating score is calculated for each message of one or more messages. As yet another example, the one or more distribution-related metrics includes a distance of each vehicle of the one or more vehicles from each RSU of the plurality of RSUs, a message priority, a received signal strength indicator, a signal quality at each RSU of the plurality of RSUs, or a combination thereof.

At operation 604, the one or more messages are sorted. For example, the one or more messages are sorted based on the message-rating score of each message of the one or more messages. As another example, the one or more messages are sorted in a plurality of virtual queues. As yet another example, each virtual queue of the plurality of virtual queues is associated with a respective RSU of the plurality of RSUs.

At operation 606, a number of messages each RSU of the plurality of RSUs can transmit to one or more vehicles is determined. For example, the determination of the number of messages each RSU of the plurality of RSU can transmit to one or more vehicles is based on a congestion limit associated with each RSU of the plurality of RSUs. As an example, an identification of which of the virtual queues do not have at least one instance of a message of the one or more messages below the congestion limit is made. As a further example, the identification of which of the virtual queues do not have at least one instance of a message of the one or more messages below the congestion limit is made in each virtual queue of the plurality of virtual queues. As an additional example, an identification of any duplicate messages of the one or more messages is made. For example, the identification of any duplicate messages of the one or more messages is made in any virtual queue of the plurality of virtual queues. As another example, the identified duplicate messages with a lowest message-rating score are removed.

As a further example, the removed duplicate messages are transmitted to one or more virtual queues of the plurality of virtual queues that do not have at least one instance of the message of the one or more messages below the congestion limit. As yet another example, the identified duplicate messages with a highest message-rating score is identified. As an additional example, the identified duplicate messages with a highest message-rating score are identified in any virtual queue of the plurality of virtual queues. For example, the identified duplicate messages with the highest message-rating score in the virtual queue that has the identified duplicate messages are retained. As another example, the identified duplicate messages with the highest message-rating score in the virtual queue that has the identified duplicate messages are retained based on each virtual queue of the plurality of virtual queues having at least one instance of the message of the one or more messages below the congestion limit.

At operation 608, each vehicle of the one or more vehicles is assigned to a respective RSU of the plurality of RSUs. For example, the assignment is based on determining the number of messages each RSU of the plurality of RSUs can transmit to the one or more vehicles. As another example, the assignment is based on an order in which the one or more messages are sorted. It is understood that the assignment may be based on determining the number of messages each RSU of the plurality of RSUs can transmit to the one or more vehicles and/or the order in which the one or more messages are sorted. As a further example, the assignment is determined using an algorithm configured to maximize a number of assigned vehicles of the one or more vehicles to each RSU of the plurality of RSUs. As another example, the maximization of the number of assigned vehicles to the RSU of the plurality of RSUs can be a multi-objective maximization. In an instance wherein the priorities are the same for each of the one or more vehicles, then the infrastructure system can cause a maximum number of vehicles to be assigned to a particular RSU of the plurality of RSUs (e.g., an equal channel load is provided to each vehicle relative to each of the vehicle's connection to the particular RSU), for example. In an instance wherein the priorities are different (e.g., based on a traffic topology) for each of the one or more vehicles, then precedence is provided to the vehicle with a higher priority thereby allotting a higher channel load to that vehicle, as another example. For example, if a vehicle can potentially block a flow of traffic at a choke point, in an instance wherein the RSU-to-vehicle link breaks down, then a higher priority will be provided to the vehicle based on the algorithm.

Thus, one or more examples of the present disclosure provides a means for reducing congestion of the channel load associated with the road-side unit in relation to the distribution of one or more messages transmitted to one or more vehicles. For example, the reduction of the congestion of the channel load is provided by an optimization routine that may include the use of an algorithm and/or various distribution-related criterion in relation to a channel load of a road-side unit to distribute the channel load such that no single road-side unit is tasked with sending messages over a congestion limit associate with the road-side unit.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

receiving, from a first vehicle of one or more vehicles, a marshaling request;

identifying, for a road-side unit of a plurality of road-side units, a channel load threshold;

determining, based on the marshaling request, whether the first vehicle satisfies a distribution-related criterion;

routing one or more marshaling infrastructure messages to a virtual queue of a plurality of virtual queues, each virtual queue is associated with a respective road-side unit of the plurality of road-side units;

generating one or more data packets based on the one or more marshaling infrastructure messages routed to the virtual queue;

transmitting the one or more data packets to the road-side unit; and assigning the first vehicle to the road-side unit of the plurality of road-side units, wherein the assignment of the first vehicle is based on the one or more data packets transmitted to the road-side unit and determining a communication load of the road-side unit is below the channel load threshold and determining the first vehicle satisfies the distribution-related criterion.

2. The method of claim 1, wherein the assignment of the first vehicle is determined, based at least in part on, using an algorithm configured to maximize a number of assigned vehicles to the road-side unit of the plurality of road-side units.

3. The method of claim 1, wherein the channel load threshold indicates a capacity for the road-side unit of the plurality of road-side units to support communication with the first vehicle.

4. The method of claim 1, wherein the distribution-related criterion includes a distance of the first vehicle from the road-side unit of the plurality of road-side units, a message priority, a received signal strength indicator, a signal quality at the road-side unit of the plurality of road-side units, or a combination thereof.

5. The method of claim 1, further comprising:

updating one or more priorities associated with marshaling of a second vehicle of the one or more vehicles;

identifying, based on the updated one or more priorities and a marshaling request received from the second vehicle, the channel load threshold for the road-side unit of the plurality of road-side units;

determining, based on the updated one or more priorities, whether the second vehicle satisfies the distribution-related criterion; and assigning the second vehicle to an alternative road-side unit of the plurality of road-side units, wherein the assignment is based on determining the communication load of the road-side unit meets or exceeds the channel load threshold and determining the second vehicle satisfies the distribution-related criterion.

6. The method of claim 5, wherein the assignment of the second vehicle is further based on the channel load threshold of the alternative road-side unit of the plurality of road-side units being below the channel load threshold.

7. The method of claim 5, wherein the one or more priorities are determined based at least on a priority associated with the channel load threshold and the distribution-related criterion.

8. A method comprising:

calculating, for each message of one or more messages, a message-rating score based on one or more distribution-related metrics;

sorting, in a plurality of virtual queues, the one or more messages based on the message-rating score of each message of the one or more messages;

determining a number of messages each road-side unit of a plurality of road-side units can transmit to one or more vehicles based on a congestion limit associated with each road-side unit of the plurality of road-side units;

routing one or more marshaling infrastructure messages to a virtual queue of the plurality of virtual queues, each virtual queue is associated with a respective road-side unit of the plurality of road-side units;

generating one or more data packets based on the one or more marshaling infrastructure messages routed to the virtual queue;

transmitting the one or more data packets to the road-side unit; and assigning each vehicle of the one or more vehicles to a respective road-side unit of the plurality of road-side units, wherein the assignment is based on the one or more data packets transmitted to the road-side unit and determining the number of messages each road-side unit of the plurality of road-side units can transmit to the one or more vehicles and an order in which the one or more messages are sorted.

9. The method of claim 8, wherein the assignment is determined, based at least in part on, using an algorithm configured to maximize a number of assigned vehicles of the one or more vehicles to each road-side unit of the plurality of road-side units.

10. The method of claim 8, wherein the one or more distribution-related metrics include a distance of each vehicle of the one or more vehicles from each road-side unit of the plurality of road-side units, a message priority, a received signal strength indicator, a signal quality at each road-side unit of the plurality of road-side units, or a combination thereof.

11. The method of claim 8, wherein determining the number of messages each road-side unit of the plurality of road-side units can transmit to the one or more vehicles further comprises:

identifying, in each virtual queue of the plurality of virtual queues, which of the virtual queues do not have at least one instance of a message of the one or more messages below the congestion limit;

identifying, in any virtual queue of the plurality of virtual queues, any duplicate messages of the one or more messages;

removing the identified duplicate messages with a lowest message-rating score; and transmitting the removed duplicate messages to one or more virtual queues of the plurality of virtual queues that do not have at least one instance of the message of the one or more messages below the congestion limit.

12. The method of claim 11, further comprising:

identifying, in any virtual queue of the plurality of virtual queues, the identified duplicate messages with a highest message-rating score; and retaining the identified duplicate messages with the highest message-rating score in the virtual queue that has the identified duplicate messages based on each virtual queue of the plurality of virtual queues having at least one instance of the message of the one or more messages below the congestion limit.

13. A system comprising:

a central server configured to:

receive, from a first vehicle of one or more vehicles, a marshaling request, identify, for a road-side unit of a plurality of road-side units, a channel load threshold, determine, based on the marshaling request, whether the first vehicle satisfies a distribution-related criterion, route one or more marshaling infrastructure messages to a virtual queue of a plurality of virtual queues, each virtual queue is associated with a respective road-side unit of the plurality of road-side units, generate one or more data packets based on the one or more marshaling infrastructure messages routed to the virtual queue, transmit the one or more data packets to the road-side unit, and assign the first vehicle to the road-side unit of the plurality of road-side units, wherein the assignment of the first vehicle is based on the one or more data packets transmitted to the road-side unit and determining a communication load of the road-side unit is below the channel load threshold and determining the first vehicle satisfies the distribution-related criterion; and the first vehicle configured to:

transmit the marshaling request to the central server.

14. The system of claim 13, wherein the assignment of the first vehicle is determined, based at least in part, using an algorithm configured to maximize a number of assigned vehicles to the road-side unit of the plurality of road-side units.

15. The system of claim 13, wherein the channel load threshold indicates a capacity for the road-side unit of the plurality of road-side units to support communication with the first vehicle.

16. The system of claim 13, wherein the distribution-related criterion includes a distance of the first vehicle from the road-side unit of the plurality of road-side units, a message priority, a received signal strength indicator, a signal quality at the road-side unit of the plurality of road-side units, or a combination thereof.

17. The system of claim 13, wherein the central server is further configured to:

update one or more priorities associated with marshaling of a second vehicle of the one or more vehicles;

identify, based on the updated one or more priorities and a marshaling request received from the second vehicle, the channel load threshold for the road-side unit of the plurality of road-side units;

determine, based on the updated one or more priorities, whether the second vehicle satisfies the distribution-related criterion; and assign the second vehicle to an alternative road-side unit of the plurality of road-side units, wherein the assignment is based on determining the communication load of the road-side unit meets or exceeds the channel load threshold and determining the second vehicle satisfies the distribution-related criterion.

18. The system of claim 17, wherein the assignment of the second vehicle is further based on the channel load threshold of the alternative road-side unit of the plurality of road-side units being below the channel load threshold.

19. The system of claim 17, wherein the one or more priorities are determined based at least on a priority associated with the channel load threshold and the distribution-related criterion.

* * * * *